United States Patent [19]

Munns

[11] Patent Number: 4,643,397

[45] Date of Patent: Feb. 17, 1987

[54] OFF-ROAD VEHICLE FAIRLEAD ASSEMBLY FOR FIBRE-OPTIC COMMUNICATION CABLE

[75] Inventor: Dennis L. Munns, Lancaster, Wis.

[73] Assignee: Deere & Company, Moline, Ill.

[21] Appl. No.: 726,252

[22] Filed: Apr. 15, 1985

[51] Int. Cl.[4] .............................................. B65H 59/00
[52] U.S. Cl. ............................................ 254/134.3 FT
[58] Field of Search ............... 254/134.3 R, 134.3 FT, 254/134.3 PA, 415, 394, 325; 242/157 R, 86.5 R

[56] References Cited

U.S. PATENT DOCUMENTS 3,306,581  2/1967  Miller ..................... 254/134.3 FT
4,213,596  7/1980  Inoue et al. ................ 254/134.3 R Primary Examiner—Robert C. Watson

[57] ABSTRACT

An improved guide means for guiding fiber-optic cable from a reel rotatably supported on the boom assembly of a vehicle to the feed tube of a shank attached to the vehicle hitch. A first fairlead assembly is fixably mounted to the top of the vehicle's ROPS and is comprised of a housing defining an opening ended chamber. Each chamber opening has a plurality of roller stratically located to form a convergence inwardly to the chamber. A second fairlead assembly is fixably mounted to the shank for directing cable to the shank feed tube. The second fairlead assembly is comprised of vertical sidewall mounted to a base and having a plurality of rollers rotatably mounted between the sidewalls for funneling the cable to the feed tubes.

5 Claims, 5 Drawing Figures

OFF-ROAD VEHICLE FAIRLEAD ASSEMBLY FOR FIBRE-OPTIC COMMUNICATION CABLE

BACKGROUND OF THE INVENTION

This invention relates to fairlead assemblies for mounting to an off-road vehicle and, more particularly, to fairlead assemblies particularly suited for guiding fibre-optic communication cable to an entrenching shank mounted to the vehicle.

It is well known that fibre-optic cable is an exemplary audio communication medium. Customarily, the fibre-optic cable is submerged beneath the ground with the air of off-road vehicle such as a crawler tractor. The crawler tractor rotatably supports a reel of fibre-optic cable forwardly of the vehicle. The cable is threaded from the reel to a fairlead assembly mounted atop the tractor's operator's station, therefrom, the cable is threaded through a shank adjustably mounted to the rear of the tractor. It is known to have mounted a second fairlead assembly on the shank for directing the fibre-optic cable to a cable feed tube intergral to the shank. The shank trenches the ground at a prescribed depth and lays the fibre-optic cable therein.

Fibre-optic cable is very sensitive to bend angles. An excess bend angle can cause a fracture in the cable filament. Therefore, during the trenching operation, it is of paramount importance to maintain the cable bend within prescribed limits.

SUMMARY OF THE INVENTION

The fairlead assembly is comprised of an elongated housing mounted to the top of the tractor's roll-over protective system flanking the operator's station. The fairlead housing includes entrance and exit structures having a plurality of rollers rotatably mounted therein. A first group of rollers is mounted in the entrance structure in a generally horizontally downward sloping manner. A second and third ground of rollers are rotatably mounted in the entrance structure. The second group of rollers is mounted in a generally vertically and outward sloping manner, interdispersed between adjacent rollers of the first group. The third group of rollers are rotatably mounted in the housing entrance opposite to and in a similar manner as the second group. The collection of rollers comprising the first, second and third groups in conjunction with a top housing wall forms a converging entrance into the fairlead housing. The fairlead housing exit structure is constructed identically to the entrance in a diverging exit manner.

A second fairlead assembly is fixably mounted to a shank hitched to the rear of the tractor. The second fairlead assembly is comprised of a housing having generally vertical sidewalls. A third group of rollers are rotatably mounted longitudinally between the sidewalls of the second fairlead sequentially in a generally downward sloping manner to, in cooperation with the sidewalls, direct the fibre-optic cable in a funnel-like manner to the feed tube of a shank hitch to the tractor.

The fairleads allow one to limit the degree of fibre-optic cable bend angle experienced by the cable during reel unwinding and delivery to the shank.

DESCRIPTION OF THE PREFERRED EMBODIMENT

Figure 1:
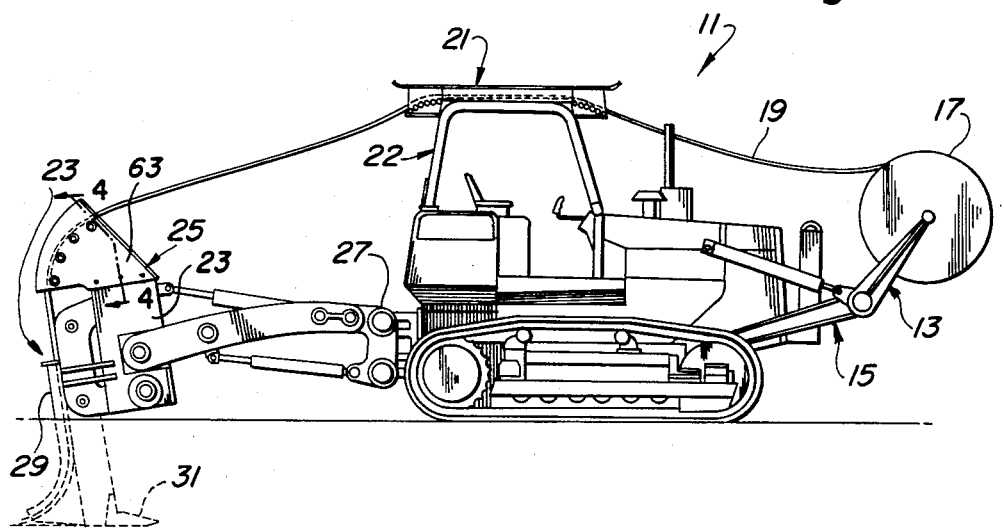
FIG. 1 is a side view of a crawler tractor suitably outfitted for entrenching fibre-optic cable employing fairlead assemblies in accordance with the present invention.

Referring to FIG. 1, a crawler tractor, generally indicated as 11, includes a cable or spool or real carrier 13 mounted to the boom assembly 15 of the tractor 11 to assume a fixed angled position in any conventional manner. A fibre-optic (F-O) cable spool or reel 17 rotatably mounted to the carrier 13 carries F-O cable 19 wound therearound. The F-O cable reel 17 is rotatably mounted to the cable reel carrier 13 in a conventional manner. As F-O cable 19 unwinds from the reel 17, it traverses a first fairlead assembly 21 fixably mounted to the top of the tractors roll over protective structure (ROPS) 22, more fully described subsequently, and a generally conventional shank 23 having a second fairlead assembly 25 fixably mounted to the shank 23. The shank 23 is fixably and detachably mounted to the vehicle hitch at 27 in a conventional manner. The F-O cable traverses the shank 23 through a cable feed tube 29 to be deposited within the trench dug by the shank plow 31.

Figure 2:
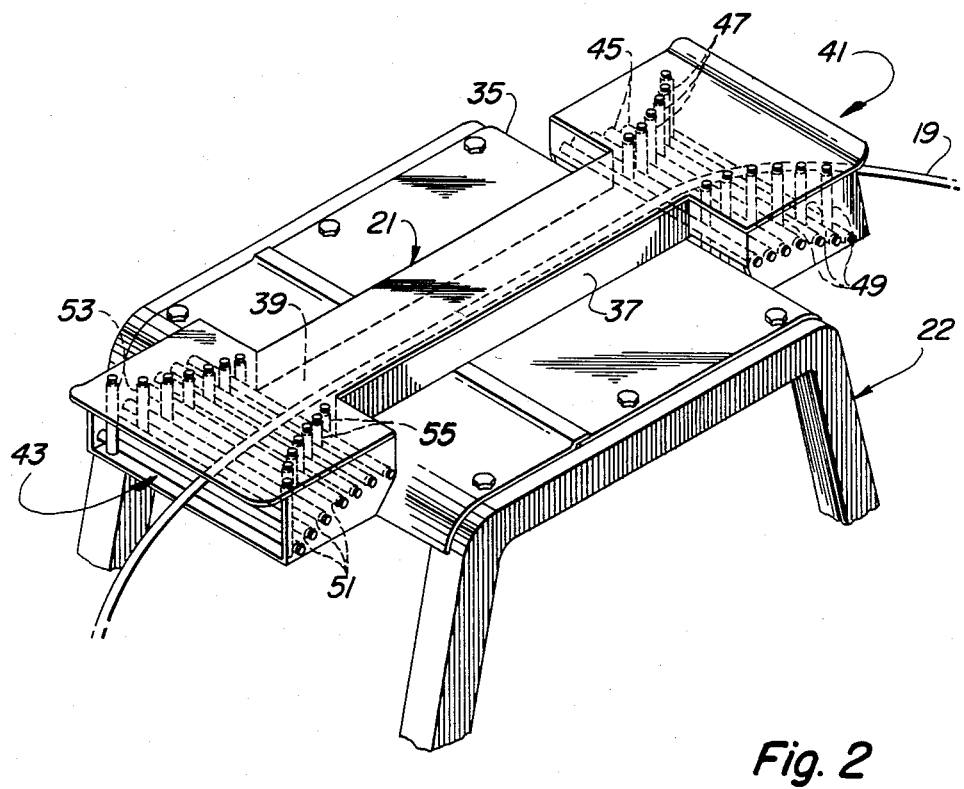
FIG. 2 is a perspective view of the first fairlead assembly in accordance with the present invention.

Referring now to FIGS. 1 and 2, a hood 35 is fixably mounted by any conventional means atop the ROPS 25. The first fairlead assembly 21 is fixably mounted to the top of hood 35 by any conventional means. The fairlead assembly 21 is comprised of a housing 37 defining an elongated open ended chamber 39 extending substantially the full length of the panel 35. The chamber 39 has smooth vertical walls, a smooth overhead wall and a floor wall, the latter being the top of the hood panel 35. The housing 37 also has entrance and exit structures 41, 43 leading to and from the tunnel or chamber 39.

A plurality of first rollers 45 of the entrance structure 41 are rotatably mounted in a subsequently described manner. The rollers 45 are mounted horizontally and sequentially in a forwardly down arcuate sloping manner beginning with an uppermost roller adjacent the forward edge of hood 35. A plurality of second rollers 47, forming a vertical wall extension to the left-hand wall of the chamber or tunnel 49, are rotatably mounted in a subsequently described manner in the chamber entrance structure 41. The rollers 47 are dispersed between respective adjacent rollers 45, and extend vertically and sequentially in a forwardly, outwardly (to the left) sloping or actuate manner beginning at the rearmost roller 47 closely adjacent the entry end of the left-hand side wall of tunnel 37. A plurality of third rollers 49 are rotatably mounted in entrance structure 41 and form a vertical wall extension to the right-hand wall of tunnel 37. Rollers 49 are dispersed between respective adjacent rollers 45 and extend vertically and sequentially in a arcuate forwardly and outwardly (to the right) sloping manner beginning with a rearmost roller 49 closely adjacent the entry end of the right-hand side wall of tunnel 37. The rollers 45, 47 and 49 collectively form a converging entrance into fairlead housing 37 for cable 19.

Figure 3:
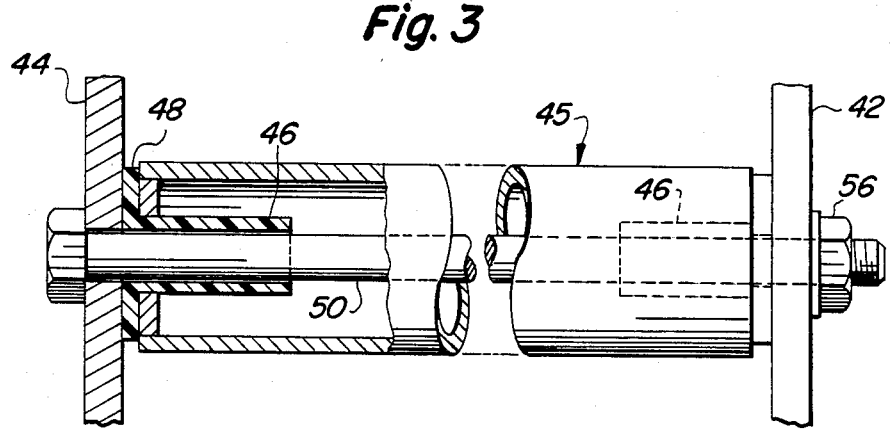
FIG. 3 is an elevated view, partially in section, of a first fairlead assembly roller in accordance with the present invention.

Each roller 45, 47 and 49 has its ends rotatably mounted to a respective wall forming the housing entrance 41. In like manner, each roller 51, 53 and 55 of the exit structure 43 has its ends rotatably mounted to a respective wall in the exit structure 43. The mounting arrangement for each roller is identical, therefore, for the purpose of brevity only one roller 45 will be described in detail. Referring to FIG. 3, roller 45 is rotatably mounted at its ends to the sidewalls 42 and 44 of the housing entrance 41. An elongated silicon ring 46 having a circular flange 48 is positioned such that the outward face of each flange 48 abuts on inner face of a respective wall 42 or 44. The rings 46 are journaled into respective ends of roller 45. A rod 50 having a head 52 at one end extends through wall 44, rings 46 and wall 42 to a threaded end that threadably receives a nut 56. The rod 50 and its silicon rings 46 journal or rotatably support rollers 45.

The exit structure 43 is constructed in a mirror image to the entrance 41 including a plurality of rollers 51 similarly situated as rollers 45, a plurality of rollers 53 similarly situated as rollers 47, and a plurality of rollers 55 similarly situated as rollers 49. The rollers 51, 53 and 55 collectively form a diverging exit from fairlead housing 37.

Figure 4:
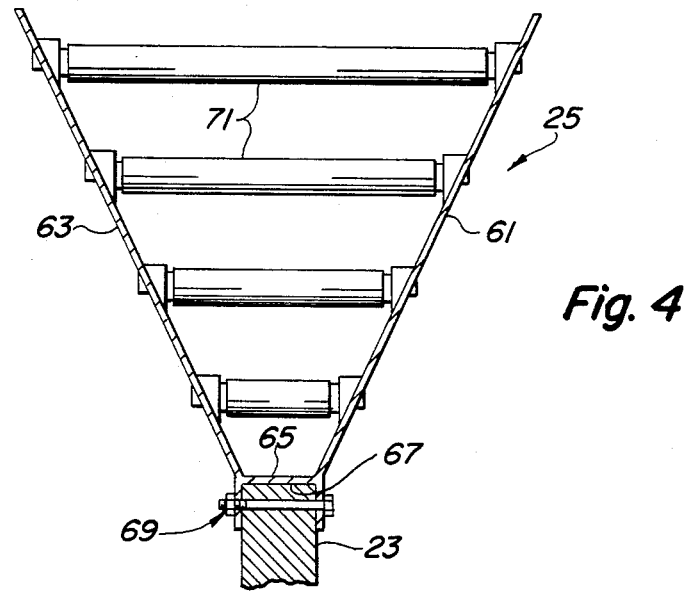
FIG. 4 is a sectional view taken along the line 4—4 of FIG. 1 showing the fairlead assembly on the shank.
Figure 5:
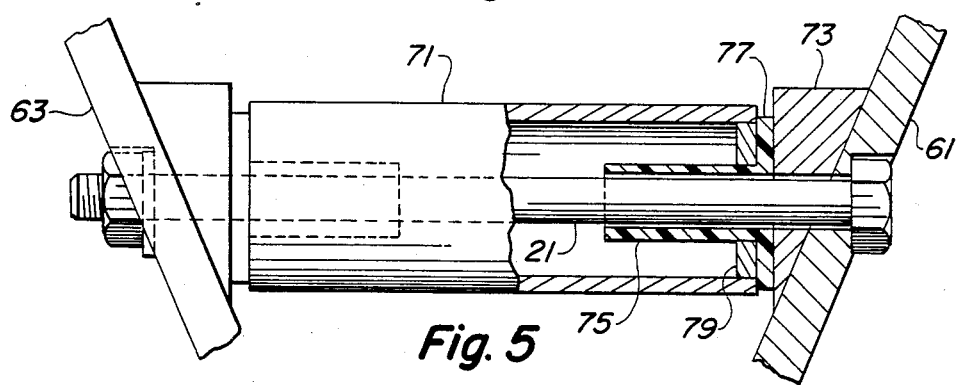
FIG. 5 is an elevated, partially in section, view of the mounting of a roller in the fairlead assembly shown in FIG. 4.

Referring to FIGS. 1 and 4, the second fairlead 25 includes opposite vertical sidewalls 61 and 63 converging to a base 65. The base 65 of the fairlead 25 includes a seat 67 which rests receivabily atop the shank 23 and is fixably mounted thereon by a plurality of nut-bolt arrangements 69 which traverses both the base 65 and shank 23. A plurality or series of rollers 71 of differing longitudinal coordinated lengths are rotatably mounted at their respective ends to the respective sidewalls 61 and 63 in a vertically rearward and downward sloping arcuate path. The cooperative positioning of the rollers 71 and sidewalls 61 and 63 funnel the traversing cable 19 to the feed tube 29 of the shank 23. One means of mounting the respective end of a roller 71 to a respective wall 61 or 63 employs a spacer 73 which is generally triangular shaped in vertical cross section (refer to FIG. 5). The spacer 73 has one surface abutting the inner surface of wall 61. An elongated silicon ring 75 having a circular flange 77 is positioned such that the outward face of flange 77 abuts to a generally vertically extending inner face of spacer 73. The end wall 79 of roller 71 is positioned around a portion of ring 75 to rotate therearound. A rod 21 is journaled through the spacer 73 and ring 75 to be received in identically at the other end in a spacer 77 and wall 63 such that roller 71 is supported in a generally horizontal alignment.

It is appreciated by one skilled in the art that the rate or degree of slope of all roller groups and the vortex angles of walls 61 and 63 in conjunction with the roller support range, can be cooperatively chosen to assure the allowable bend angle specified for the particular fibre-optic cable 19 is not exceeded as the cable traverses the first and second fairleads.

I claim:

1. A fairlead assembly comprised of an elongated housing defining an elongated open ended tunnel extending from an entry end to an exit end; an entry structure at said entry end including a plurality of rotatably mounted rollers, said rollers having a first group of horizontal transversely rotatably mounted rollers at said entry end, each of said rollers in said first group to extend sequentially to have a downwardly sloping vertical projection from said entry end with the uppermost roller being closely adjacent a lower edge of the tunnel, a second group of vertical rollers rotatably mounted sequentially at said entry end, said rollers in said second group having lower end portions dispersed between adjacent rollers of said first group and to have an outwardly sloping horizontal projection from one side of said tunnel, a third group of vertical rollers rotatably mounted sequentially in said opening, said rollers in said third group having lower ends dispersed between adjacent rollers of said first group and having an outwardly sloping horizontal projection opposite to said second group and from the other side of said tunnel, said rollers collectively defining an inwardly directed convergence at said entry end.

2. An improved fairlead for guiding cable over the top of a vehicle from a forwardly positioned reel rotatably supported on a boom assembly on the vehicle to a feed tube on a shank supported on and rearwardly of the vehicle, said fairlead comprising:

a housing defining an elongated fore-and-aft, open-ended tunnel rigid with and extending substantially the full length of the top of the vehicle and having overhead and floor walls extending between transversely spaced left- and right-hand vertical sidewalls; an entry structure to said tunnel composed in part of transversely extending rotatable horizontal rollers disposed in a downwardly and forwardly extending arcuate path, as viewed from the side, beginning with an uppermost and rearwardmost roller at the forward edge of the floor wall, said entry structure further including left- and right-hand vertical roller walls extending in forwardly and outwardly extending arcuate paths, as viewed from the top, from the forward edges respectively of the left- and right-hand vertical sidewalls, and each including a series of vertical rollers projecting upwardly from said horizontal rollers with the rearwardmost vertical roller of each series being adjacent to the forward edge of the respective vertical side wall; and an exit structure to said tunnel composed, in part, of transversely extending, rotatable horizontal rollers disposed in a downwardly and rearwardly extending arcuate path, as viewed from the side, beginning with a forwardmost and uppermost roller at the rear edge of the floor wall, said exit structure further including left- and right-hand roller walls, extending in rearwardly and outwardly extending paths, as viewed from the top, from the rear edges respectively of the left- and right-hand sidewalls, and each vertical roller wall including a series of vertical rollers projecting upwardly from the horizontal rolls of the exit structure with the forwardmost verrical roller of each series being adjacent to the rear edge of the respective vertical sidewall.

3. An improved fairlead for guiding cable over the top of a vehicle from a forwardly positioned reel rotatably supported on a boom assembly on the vehicle to a feed tube on a shank supported on and rearwardly of the vehicle, said fairlead comprising:

a housing defining an elongated fore-and-aft, open-ended tunnel rigid with and extending substantially the full length of the top of the vehicle and having overhead and floor walls extending between transversely spaced left- and right-hand vertical sidewalls; an entry structure to said tunnel composed in part of transversely extending rotatable horizontal rollers disposed in a downwardly and forwardly extending arcuate path, as viewed from the side, beginning with an uppermost and rearwardmost roller at the forward edge of the floor wall, said entry structure further including left- and right-hand vertical walls, each wall being composed of a series of vertical rollers, said walls extending in forwardly and outwardly extending arcuate paths, as viewed from the top, from the forward edges respectively of the left- and right-hand vertical sidewalls, and each of said series of vertical rollers projecting upwardly from said horizontal rollers with the rearwardmost and innermost vertical roller of each series being adjacent to the forward edge of the respective vertical sidewall.

4. The invention defined in claim 3 in which the vertical rollers of the left- and right-hand vertical walls are alternately spaced with respect to the horizontal rollers and the lower ends of the vertical rollers are supported beneath the horizontal rollers.

5. The invention defined in claim 3 further characterized by a second fairlead assembly including a housing having generally tranversely spaced and downwardly converging side walls fixed at their lower ends to said shank, a series of horizontal rollers extending between the side walls and defining, when viewed from the side, an arcuate rearwardly and downwardly extending roller surface for a cable to move over between a comparatively wide upper end and a narrow lower end leading to said feed tube.

* * * * *